Aug. 24, 1954

W. C. WHEELER 2,686,986

MOUNT FOR TRANSPARENCIES

Filed Sept. 25, 1951

INVENTOR.
Walter C. Wheeler

Patented Aug. 24, 1954

2,686,986

UNITED STATES PATENT OFFICE 2,686,986

MOUNT FOR TRANSPARENCIES

Walter C. Wheeler, Washington, D. C.

Application September 25, 1951, Serial No. 248,167

12 Claims. (Cl. 40—158)

This invention relates to devices for mounting transparencies, such as photographic transparencies, and it is concerned especially with means for mounting a relatively miniative transparency in a mount which is designed to accommodate one of larger dimensions.

A commonly used size of transparency is the so-called 35 mm. transparency, the mounts for which are readily available. It frequently happens, however, that one desires to mount a smaller size transparency for still projection, such as a single frame or transparency from a 16 mm. or 8 mm. moving picture reel, or a transparency derived from an exposure made in a miniature camera which uses a 16 mm. or 8 mm. film. The latter transparencies are diminutive and difficult to mount individually. The need of convenient means for mounting such smaller transparencies in larger projection mounts, such as the kinds referred to, has long been desired.

For the purposes of the present invention, I provide, in general, an apertured screened transparency comprising two transparent members preferably hingedly joined to one another, and between which the transparency to be mounted is secured to one of the transparent members in proper position over the aperture. The invention will be described with reference to a preferred embodiment thereof which is illustrated in the accompanying drawings in which.

Figure 1:
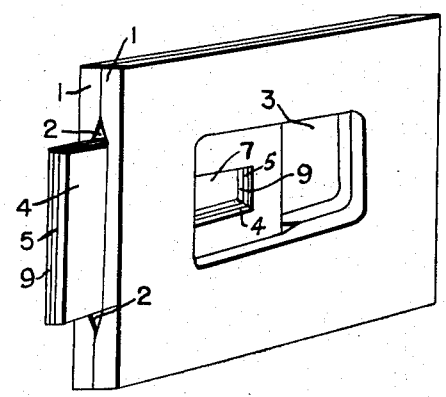
Fig. 1 is a view in perspective of a transparency mount, such as the well known cardboard mount commonly available for mounting so-called 35 mm. transparencies showing a transparency assembly made in accordance with the present invention, partially inserted in the mount and adapted to mount a single diminutive transparency.

Referring to Fig. 1, a standard readily available form of mount comprises a pair of apertured non-transparent sheet members 1, such as cardboard, suitably joined together along three edges and provided with a marginal open space or slit 2 between the sheet members and around the edge of the aperture 3 to accommodate marginal areas of a transparency to be mounted for projection. For convenience in mounting, the members of the mount are not joined together along a part of one edge so that the transparency may be inserted between the members and in front of the aperture 3 therein, but means are often provided for sealing the mounted transparency in place, as by pre-coating the contiguous non-joined edges of the mount members with adhesive. The adhesive-coated margins may finally be joined together when the transparency is mounted in place in such a mount.

Figure 2:
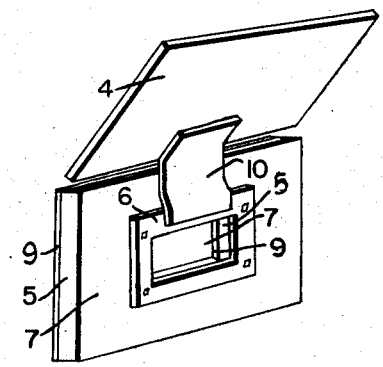
Fig. 2 is a view in perspective of my novel combination which is constructed to be mounted in the mount of Fig. 1, with which the smaller sized film shown in Fig. 2 is combined.

The present invention comprises a screened device for mounting a small transparency 6 (Fig. 2) in such a mount. The transparency 6 is considerably smaller than the normal transparency aperture 3 of Fig. 1. The parts 4 and 5 of the holder of the present invention are proportioned to be inserted in the mount 1 of large size in place of a normal size transparency ordinarily used. Referring to Fig. 2, the said device insert or transparency holder comprises a pair of covers 4 and 5, at least one of which is larger than the transparency 6 to be mounted. The base cover member 5 is cut to about the size of the larger size of film which fits the aperture 3 of the mount 1. When the transparent cover member 4 of the holder is disposed over the transparency and the unscreened and transparent part of cover member 5 the assembled device is mounted in the larger sized mount 1, as an insert, blank, or substitute for the film size intended for the mount.

The base cover member or insert 5 of the novel combination preferably comprises a non-transparent or opaque marginal portion 9 which has one or more transparent portions or openings 7. The small sized transparency 6, such as a 16 mm. transparency, is mounted over the opening, window or transparent portion 7, and the non-light-transmitting portion 9 is proportioned to frame the picture on the diminutive transparency 6. The window or opening 7 may be formed, for example, by suitably superimposing a non-light-transmitting coating 9 of any kind on a transparent base member 5. A window of suitable proportions is thus formed for viewing the transparency. Alternatively, the base member composed of non-light transmitting material may have a window 7 appropriately formed in it to permit viewing of the transparency. Still another modification may be constructed by removing a part of an opaque coating on a transparent base material so as to frame the transparency.

The transparency 6 is preferably mounted on the base member 5 only at one edge. This may desirably be done by inserting the edge of the transparency under the unattached edge of a thin piece of strip material 10 which is attached to the base member 5 except for an area along one edge under which the edge of the transparency is entered. This means for holding the film in register before the transparent window 7 may be only a narrow thread or ribbon-like strip which is adhesively joined underneath with the exposed surface of the transparency at its edge when the transparency is in proper register on the base member. At its edge this adhering strip 10, however, may be provided on either surface with adhesive. Preferably, however, I provide a strip 10 of thin sheet material provided on one side with a non-hardening adhesive, a suitable material being a piece of well known strip material composed of "cellophane" covered on one side with a non-hardening adhesive such as "Scotch-tape." I prefer to use an elongated strip of adhesively covered material (Figs. 2 and 3), preferably carrying such a non-hardening adhesive which is long enough to be attached to the transparent cover member 4 and operate as a hinge at the contiguous edges of the members 4 and 5.

The cover member 4 must necessarily be as wide as the window or opening 7 and must be transparent at least in its portion which registers with the window 7 when it covers the mounted transparency. For example, it may comprise only a strip of sheet material of suitable width and length to cover the transparency, but preferably I provide as a cover 4, a clear transparent sheet about the same size as the base member 5 and hingedly join it to the base member 5 along one edge for a distance about the length of the film to be mounted as shown in Fig. 2. The strip 10 is preferably covered on one side with a non-hardening adhesive which is sufficiently viscous to prevent readily displacing the strip 10 or the transparency 8 when the same is mounted. However, any suitable adhesive can be used.

The provision of a non-hardening adhesive is most advantageous in that the members 4 and 5 constituting a blank may be preassembled in the mount without the film. Then when it is desired to mount the film, the blank assembly is removed from the mount, as indicated in Fig. 1. Then the cover 4 is removed from the face of the base member 5, as for example by hingedly displacing it as indicated in Fig. 2. Then the edge of the holding strip 10 is suitably raised to admit the edge of the transparency. When the transparency is in exact register with the window 7 it is held in place by firmly engaging the adhesive on the under side of the strip 10 with the transparency. In order to make the maximum area of the transparency available for viewing or projection, the window 7 must be cut to exact size. This permits of allowances of extremely small clearances, and exact mounting of a film such as a 16 mm. film is necessary. This, however, is easily and readily accomplished when the adhesive on the strip 10 is tacky in that the transparency can be moved a small fraction of an inch and remain wherever it is placed merely by suitably applying the thumb and index finger to opposite sides of the transparency and base member 10. When the transparency is exactly placed, the cover member 4 is replaced and the assembly is again inserted in the mount 1. The adjoined parts of mount 1 serve to compress the cover member 4, strip 10 and marginal areas of the transparency against the base member 5 and retain the transparency in its mounted position. The mount may then be closed along the entering slit 2 by any means, such as sealing.

Figure 3:
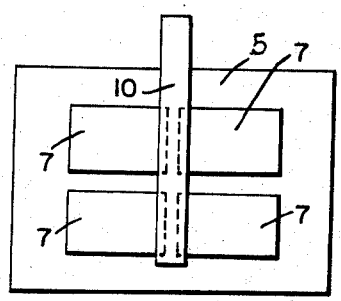
Fig. 3 is a side elevational view of a modified form of a screened member of the novel combination adapted to mount four diminutive transparencies.
Figure 4:
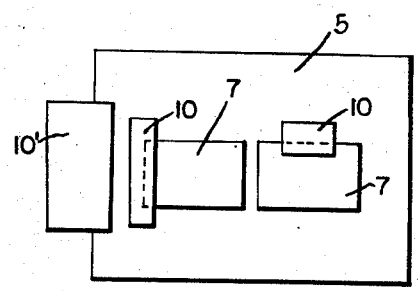
Fig. 4 is a side elevational view of another modified form of a screened member, adapted to mount two diminutive transparencies.

The base member 5 may be provided with one or a plurality of windows 7. For example, four windows may be provided in a so-called 35 mm. film for mounting four so-called 16 mm. films as indicated in Fig. 3. As a practical matter, the window in a so-called 35 mm. mount is about 33.5 mm. long and 23 mm. wide, whereas the so-called 16 mm. transparency is rectangular, relatively proportioned and smaller. In providing for mounting a plurality of transparencies, a convenient arrangement is to provide a narrow non-transparent frame member between two windows 7 positioned end to end as shown in Fig. 3. Then a narrow strip 10 of adhesive tape not wider than the non-transparent dividing portion is attached to the base member 5. The transparencies 7 may then be mounted end to end under opposite edges of the adhesive tape 10 as indicated in the frames of Fig. 3. The strip 10 may also be extended beyond the edge of the base member where it is attached to the cover member 4, and serves as a hinge member for the cover member 4. If desired, however, a separate hinge member 10' can be provided as shown in Fig. 4. Another arrangement for mounting a plurality of transparencies is to provide separate mounting tabs as shown in Fig. 4. Separate additional tabs may serve in conjunction with the described mounting strips as auxiliary mounting strips, but ordinarily the preferred embodiments, such as those shown in the drawings are sufficient. The hinge member 10' shown in Fig. 4 may be made of adhesive tape and secured along the contiguous edges of the base and cover members. In preparing a frame of 16 mm. moving picture film of well known design, the film may desirably be cut transversely a small distance from the edge of the frame to allow clearance for attaching the edge of the adhering member 10.

From the foregoing disclosure it will be recognized that the invention is susceptible of modification without departing from the spirit and scope thereof, and it is to be understood that the invention is not restricted to the specific illustrations thereof which are herein set forth.

I claim:

1. A holder for mounting transparencies which is adaptable for retention within an envelope of the kind which comprises two opposed apertured non-transparent mats which are marginally joined and in which the apertures therein are in register with each other for forming a light-transmissible opening across which the holder is to be mounted; said holder comprising a plain sheet-form base member having a masked area forming a non-transparent framing around a light-transmissible area across which the transparency is to be mounted, said light-transmissible area being located within and being smaller than the light-transmissible area of said envelope when the holder is in mounted position, a tab of sheet-form material mounted on said masked area having an adhesive edge portion disposed near and along a margin of the non-transparent framing for securing the edge portion of the transparency to be mounted, and a sheet-form light-transmissible cover disposed over and in contact with said base member, said adhesive tab being disposed between said cover and base member, and said cover being disposed to bear forcibly on the transparency when it is in mounted position.

2. A holder in accordance with claim 1 in which the tab has a viscous non-hardening adhesive on its edge portion near the margin of the light-transmitting area.

3. A holder for mounting transparencies in accordance with claim 1 which comprises a sheet-form hinge connecting the base and cover members.

4. A holder for mounting transparencies in accordance with claim 1 in which the tab mounted near and along a margin of the non-transparent framing is extended beyond the edge of the base member and attached to the cover member to form a hinge.

5. A holder in accordance with claim 1 in which the screening means is non-transparent material adhered to one side of the base member; and the means for mounting the transparency is disposed on the opposite side of the base member from said non-transparent material.

6. A holder for mounting transparencies in accordance with claim 1 in which the base member is provided with a plurality of rectangular light transmitting areas spaced from each other, and the means for securing the transparencies in place comprises a single adhesive-coated strip on the base member in the non-transparent area contiguous to a plurality of said areas, said adhesive coated strip being disposed for attaching marginal portions of a plurality of the transparencies thereto.

7. A mount for a transparency comprising a transparency holder and a pair of registering apertured non-transparent mats in contact with each other and directly fastened to each other along three edges, said mats being mounted on either side of said holder with the holder extending across said registering apertures and with the unfastened edges of said mats forming a slit for inserting the holder; said transparency holder comprising a plain sheet-form transparent base member having a non-transparent framed portion forming a light-transmissible area across which a transparency is to be mounted; a tab of sheet-form material adhesively mounted on a screened portion of said base member with an edge portion of the adhesive-bearing tab disposed near and parallel to a margin of the non-transparent framed portion; adhesive on said tab near the edge portion thereof for adhesively securing thereto a marginal portion of a transparency to be mounted across said framed light-transmissible area; and a light-transparent sheet-form cover member disposed to be contiguous to and bear upon said transparency, said tab and said base member; said cover member and base member being disposed with their marginal areas between the marginal areas of the apertures of said mats and with said light-transmissible area of the base member within the apertured areas of said mats.

8. The combination in accordance with claim 7 in which the tab has a viscous non-hardening adhesive at least on its edge portion near the margin of the light-transmitting area for adhering to a marginal portion of the transparency to be mounted.

9. The combination in accordance with claim 7 which comprises a sheet form hinge connecting the base and cover members.

10. The combination in accordance with claim 7 in which the tab is extended beyond the edge of the base member and attached to the cover member to form a hinge.

11. The combination in accordance with claim 7 in which the screening means is non-transparent material adhered to one side of the base member, and the means for mounting the transparency is disposed on the opposite side of the base member from said non-transparent material.

12. The combination in accordance with claim 7 in which the base member is provided with a plurality of rectangular light transmitting areas spaced from each other in a rectangular arrangement, and the means for securing the transparencies in place comprises a single adhesively coated strip extending across the base member in the non-transparent area contiguous to all of the rectangular areas, and disposed for attaching marginal portions of the transparencies thereto.

References Cited in the file of this patent

UNITED STATES PATENTS

| Number | Name | Date |
| --- | --- | --- |
| 1,913,609 | Morny | June 13, 1933 |
| 2,291,173 | Simpson | July 28, 1942 |
| 2,495,142 | Seary | Jan. 17, 1950 |
| 2,534,961 | Dunn | Dec. 19, 1950 |
| 2,587,434 | Boaden | Feb. 26, 1952 |

FOREIGN PATENTS

| Number | Country | Date |
| --- | --- | --- |
| 23,365 | Great Britain | Oct. 28, 1915 |